3,067,045
INORGANIC COATING
Walter M. McMahon, La Habre Heights, Calif., assignor to American Pipe and Construction Co., South Gate, Calif., a corporation of Delaware
No Drawing. Filed Mar. 28, 1960, Ser. No. 17,765
21 Claims. (Cl. 106—14)

The present invention relates to a new wholly inorganic non-flammable coating composition capable of protecting metals, particularly iron and steel from atmospheric corrosion adapted to be applied by the usual methods such as spraying roller coating dipping or brushing and producing hard continuous firmly adherent films free from blisters in direct contact with the metal being protected.

More particularly, the present invention relates to coating compositions containing a predominating amount of finely divided zinc as the essential metal protecting pigment dispersed in an aqueous solution of an alkali metal phosphate which reacts with said finely divided zinc and limited amounts of metal oxide regulators which regulates and retards the setting action of the zinc and alkali metal phosphates at the pH of the composition which varies from between 6.5 and 11.5; this pH being preferable from 8–11.

It is known to prepare paint compositions consisting of aqueous alkali metal phosphate and zinc dust which interact, in situ, to form a solid protecting layer. The setting interaction between the zinc dust and alkali metal phosphate at pH of 6.2 and higher occurs with substantial evolution of heat, is very rapid, and somewhat erratic and there is a tendency to form blisters in the coating applied to clean metal surfaces.

In accordance with the present invention, it has been discovered that the setting time of mixtures of finely divided zinc with aqueous solutions of alkali metal phosphate at pH between 6.5 and 11.5 may be regulated with metal oxide regulators in limited proportions, there being present at least 14% and not more than about 55% by weight of the zinc dust present whereby the setting time of the zinc-alkali metal phosphate is substantially lengthened and the difficulty with blistering is overcome. The metal oxide regulator which is employed is selected from the group consisting of litharge, mixtures of litharge and red lead containing up to 50% of red lead, mixtures of litharge and lead dioxide containing up to 50% of lead dioxide, mixtures of litharge and up to 50% of lead dioxide and red lead, cuprous oxide, colloidal ferric oxide, colloidal ferric hydroxide, and mixtures of litharge with up to 50% of cuprous oxide, colloidal ferric oxide and colloidal ferric hydroxide, these each alone and together.

In the absence of the metal oxide or hydrated metal oxide regulators of the present invention, the unmodified suspension of finely divided zinc dust has extremely short pot life thickening so rapidly at about pH 7–10 as to be practically useless for large scale coating operations and producing badly blistered coatings. As the alkalinity increases to about pH 9, blistering is worsened and adhesion falls off; the coating tending to become powdery and non-adherent to the freshly cleaned metal surfaces.

Addition of the regulating metal oxides in the proportions taught by the present invention not only controls the setting rate to attain a commercially useful pot life for large scale coating application, but also overcomes the blistering tendency of the unmodified zinc-alkali phosphate coating mixture and permits reasonable film curing time after application of the regulated coating to attain a tightly adherent hard water-insoluble cured film uniformly hardened throughout its thickness.

For example, the addition of from 45–55 parts of litharge per 100 parts of zinc dust in a formulation containing 32 parts of water and 23 parts of potassium monohydrogen phosphate provides a very satisfactory continuous tightly adherent film up to 6–7 mils in thickness on steel having a pot life of several hours and drying at 75–90° F. without blistering. By replacing up to 50% of the litharge with red lead or lead dioxide the same pot life is achieved but the resulting film coated on metal is even harder. The total amount of litharge mixture with red lead or lead dioxide can be considerably reduced since amounts of litharge between about 14–35 parts containing 50% of red lead or lead dioxide or 50% of these latter in combination based on the litharge provide very satisfactory cured films free from blisters, the composition having a pot life of several hours. It appears that the addition of red lead and lead dioxide cuts down the curing time in the film at ambient temperature while permitting economy in litharge requirement for lengthening pot life while achieving harder films.

The regulator may also consist of cuprous oxide, alone, it being preferred that at least 14% and not more than 25% be used based upon the finely divided zinc which is present. Similarly from 14% to about 25% of colloidal ferric oxide or colloidal ferric hydroxide represent preferred proportions. In these preferred ranges, the cuprous oxide, colloidal ferric oxide and colloidal ferric hydroxide each provide a lengthening of pot life to several hours without detracting from normal curing of 4–6 hours at ambient temperature and produce blister-free tightly adherent films on metal.

Also effective are mixtures of the aforementioned copper oxide and colloidal iron oxide or hydroxide with each other, each with litharge and these together with litharge in amounts up to 50% of litharge and preferably to provide a level of total regulator between about 18–50 parts of regulator per 100 parts of finely divided zinc.

In order to provide uniform and reproducible setting and curing activity of the metal oxide regulated zinc-alkali phosphate coating compositions of the invention, there is required to be at least 7 parts of alkali metal monohydrogen phosphate (potassium or sodium) per 100 parts of finely divided zinc present in the alkali metal phosphate solution. At alkaline pH up to 11, throughout which range satisfactory coatings are produced in accordance with the invention, the predominating form of alkali metal phosphate is alkali metal monohydrogen orthophosphate whether made by reacting phosphoric acid with alkali metal hydroxide to give a solution of the same salt content or by reacting together suitable amounts of potassium orthophosphate, potassium monohydrogen phosphate, potassium dihydrogen phosphate or the various hydrates of these salts for pH between 6.5 and 11.5. In any event sufficient phosphate materials are used so that the alkali metal phosphate content expressed as potassium monohydrogen phosphate is between 7 parts and 12.5 parts, preferably between 10 and 12 parts per 100 parts of zinc dust in the final composition.

Generally, the amount of water used as the volatile medium for the wholly inorganic coating of the invention is regulated to permit uniform setting action after application of the coating to the clean metal base while permitting sufficient pot life (about 1–2 hours) to permit commercial scale coating operation. If the water content of the composition is less than about 12% by weight the combined ingredients, despite the inhibiting action of the metal oxide regulator, the amount of water is insufficient to provide reproducible setting or curing of the coating by in situ reaction at ambient temperature after the film is applied to the metal base. Between about 12%–18% of water in metal oxide regulated compositions based upon litharge, the viscosity of the paint is quite substantial, making application by brushing easier than by spraying. Litharge regulated composition having a water content of above 16% based on total weight and up to 25% are preferred for spray application. Above 25% the tendency towards excessive dryness of film after curing and towards blistering appears. In the case of colloidal iron oxide, colloidal iron hydroxide, and cuprous oxide regulated compositions, the water content may be up to 40% by total weight of the composition; in fact, these films based upon copper and iron oxides appear to cure somewhat faster in the presence of larger amounts of water than films based upon litharge alone. The red lead and lead dioxide modified litharge regulators appear to have a comparable film curing time as with the copper oxide and iron oxide modified film, but the litharge based films are preferably formulated to a lower water content based upon total ingredients. To illustrate the optimum water content for copper oxide and colloidal iron oxide, modified coatings applied by spraying or brush is about 25–40% while the optimum content of water for spraying and brush application in litharge regulated compositions is about 15–20% by weight of total ingredients. This larger amount of water in the copper oxide and colloidal iron oxide regulated films appears to be desirable to enhance curing after coating application to form the wet film. In fact, the copper oxide and colloidal iron oxide films appear to cure faster if kept intermittently wet during the 4–6 hour film curing period.

Properties of the coating compositions and films applied to clean steel surfaces are listed below in Table I to facilitate comparison of the various factors referred to hereinabove:

The various ingredients just referred to except for the zinc dust are mixed with water and are stable indefinitely. It is also desirable to add to these ingredients a bodying agent such as bentonite in an amount equal to from 0.25 to 0.75 gram per each 100 grams of zinc in the final composition.

The effect of the particle size of the zinc dust is largely that for conditioning reactivity and rapidity of setting with alkali metal phosphate; hence the use of smaller amounts of zinc of finer particle size with the alkali metal produces an end result that the amount of metal oxide regulator may also be correspondingly smaller towards the minimum value within the range therefor. For example, the litharge-metal dioxide may be reduced towards the lower limit of 14 parts per 100 parts of finer zinc dust if the amount of alkali metal phosphate is simultaneously reduced, but the stated critical proportions for the ingredients hold for extremely fine particle size zinc and the coarser size.

A preferred method of making the metal oxide regulated paint compositions is to add to a clear solution of the alkali metal phosphate in water first the metal oxide regulator and thereafter add the required amount of finely divided zinc, preferably in the form of zinc dust having a particle size of about 4–10 microns.

Preferably the zinc powder used in the composition is of 6 micron average particle size and coated with calcium oxide. Other sizes such as 3–4 micron average or 8–10 micron average may be used. Where smaller sizes of zinc are used the most desirable amount of zinc varies. Thus for a 3–4 micron size about 80 grams of zinc can be used with the same amount of alkali phosphate solution rather than 100 grams and where the 8–10 micron size is used about 135 grams of zinc may be used.

The various ingredients just referred to except for the zinc dust are mixed with water and are stable indefinitely. It is also desirable to add to these ingredients a bodying

TABLE I

| Composition and Regulator | Pot Life | Film Curing Time at Room Temperature | Percent Water | Properties of Film Coating |
|---|---|---|---|---|
| 1. Control composition, 100 parts zinc dust, 23 parts $K_2HPO_4$ 32 parts $H_2O$. | less than 5 min., swells, blisters, gives off heat. | less than 10 minutes. | 20 | weak film, blistered, poor adhesion. |
| 2. Control composition with litharge regulator in weight ratio of 52/100 litharge to zinc. | 1½–2 hrs | 6–8 hours | 16 | strong film, no blistering, good adhesion. |
| 3. Control Composition with litharge and red lead regulator; weight ratio to Zn=35/100. | 2–3 hours | 3–5 hours | 16 | strong film, tougher than 2, no blistering, good adhesion, faster curing than 2 and 4. |
| 4. Control composition and litharge and lead dioxide regulator; weight ratio to Zn=34/100. | 2–3 hours | 5–7 hours | 16 | strong film, tougher than 2, no blistering, good adhesion. |
| 5. Control composition with cuprous oxide regulators; weight ratio to Zn=15/100. | 1½–2 hrs | 3–4 hours | 38 | hard film tends to be brittle. |
| 6. Control composition with colloidal ferric oxide; weight ratio to Zn=13/100. | 1½–2 hrs | 3–4 hours | 34 | tough films, less brittle than 5. |
| 7. Control composition with litharge and colloidal ferric hydroxide; weight ratio to Zn=35/100. | 2–3 hours | 4–5 hours | 18 | adherent film, tough, hard, more flexible than 6. |

A preferred method of making the metal oxide regulated paint compositions is to add to a clear solution of the alkali metal phosphate in water first the metal oxide regulator and thereafter add the required amount of finely divided zinc preferably in the form of zinc dust having a particle size of about 4–10 microns.

Preferably the zinc powder used in the composition is of 6 micron average particle size and coated with calcium oxide. Other sizes such as 3–4 micron average or 8–10 micron average may be used. Where smaller sizes of zinc are used the most desirable amount of zinc varies. Thus for a 3–4 micron size about 80 grams of zinc can be used with the same amount of alkali phosphate solution rather than 100 grams and where the 8–10 micron size is used about 135 grams of zinc may be used.

agent such as bentonite in an amount equal to from 0.25 to 0.75 gram per each 100 grams of zinc in the final composition.

Because of the dense, metallic nature of the zinc, the films discussed herein are excellent barriers to water. Furthermore, the high concentration of zinc provides protection to the more noble iron at discontinuities in the film. The effect of the zinc in this respect becomes more pronounced when the regulator metal oxides are added to the film. Cuprous oxide, litharge, red lead, lead dioxide and ferric hydroxide appear to prevent polarization of the zinc and thus enhance its anodic activity. Zones of corrosion inhibition are larger in films containing these salts than in the straight zinc or phosphate films.

The following examples illustrate the invention but are not limiting; parts given therein are parts by weight and temperatures are set out in degrees Fahrenheit.

*Example I*

LITHARGE REGULATOR AND CONTROL

To a clear solution of 23 parts of potassium monohydrogen phosphate in 32.2 parts of water there were added 52.0 parts of litharge and 100 parts of zinc dust coated with calcium oxide having an average particle size of 4–6 microns.

A second preparation was made using 31.0 parts of litharge with the same proportions of the same ingredients as in the preceding paragraph.

A third preparation was made omitting the litharge of the two preceding paragraphs, this being a control.

The control from which the metal oxide regulator is absent set in less than 5 minutes, first by chemical interaction of zinc and phosphate after 1–2 minutes to form gas (hydrogen), then to form a gel stage which is thixotropic. Coating by brushing on a clean steel surface as soon as the gel was formed was difficult due to the rapid thickening chemical action and in a thick film (about 6–8 mils) applied heat of reaction continued to evolve and continued evolution of gas was noted resulting in blistering. When coated on a clean glass surface rather than a steel surface blistering was largely obviated but the mixture in the film was quite heavy and thick. Not until 24 hours' standing at room temperature was the dry film completely water resistant. The dry film was not of uniform thickness and discontinuities were observed.

With both the first and second preparations of this example, coatings were applied to a clean glass surface and a clean steel surface. A pot life of 1½ hours was noted for both of these preparations before thickening proceeded to a point where the preparation could not be brushed, demonstrating the effectiveness of the inhibiting action of the selected metal oxide, litharge. The films coated onto clean steel and clean glass surfaces were continuous unblistered and unbroken, tougher, and more flexible than the control film. These films were completely set after 6 hours and water resistant after 18 hours. The film coated with the first preparation having the larger proportion of litharge was slightly softer than the film having a lower proportion of litharge. No sharp rise in temperature as in the case of the control preparation was observed with either the first or second preparation demonstration an inhibiting action of the metal oxide regulator for the evolution of gas during and after gel formation.

All of the films were permitted to set at room temperature, 75–80° F.

*Example II*

COMBINATION OF LITHARGE AND RED LEAD

This example illustrates a coating formulation having longer usable pot life than the litharge formulations of Example I and producing films on metal which are harder, tougher and more quickly set than those in Example I. The following formulation was prepared:

First the red lead and litharge were added to the aqueous phosphate and then the zinc was added.

Calcium oxide coated zinc dust (6 microns) ____ 100.0
Water _____ 28.6
Potassium sodium monohydrogen phosphate _____ 20.4
Litharge _____ 21.0
Red lead _____ 4.0

The ratio of litharge to red lead was then reduced and the minimum amount which prevented blistering in the basic formula was found to be 14.1 parts. With this at least 10.7 parts of red lead was required to give a pot life of 1–2 hours.

Coatings were applied to clean glass and clean steel surfaces as in Example I and harder, tougher continuous coatings were produced which set in 4–6 hours without evolution of gas and were water resistant after 16 hours at room temperature, 75–85° F.

*Example III*

COMBINATION OF LITHARGE AND LEAD DIOXIDE

This example illustrates the use of lead dioxide regulator in admixture with litharge to provide coating compositions having equivalent pot life to those in Example II and to provide films equivalent in every respect to those in Example II.

The following formulation was prepared by first adding the litharge and lead dioxide to the aqueous phosphate solution and then adding zinc:

Calcium oxide coated zinc dust (6 microns) ____ 100.0
Water _____ 28.6
Potassium or sodium monohydrogen phosphate ___ 20.4
Litharge _____ 18.6
Lead dioxide _____ 5.36

Half of the lead dioxide in the above can be replaced with red lead without any change of film properties. In order to reduce the litharge content to 16.1, the lead dioxide had to be doubled to prevent blistering.

*Example IV*

COPPER OXIDES WITH THE LITHARGE AND LEAD OXIDE SYSTEM

In the formulations of Examples II and III above one-third to one-half of the red lead and lead dioxide were replaced by cuprous oxide to give similar results. Also a small amount (1.78 parts) was added to the formula in Example I to increase the latter's pot life by one-half hour. Cupric oxide was also used in a direct weight substitution for red lead in Example II above without any noticeable change in the system for either pot life or quality of coating.

*Example V*

SYSTEMS EMPLOYING SODIUM OR POTASSIUM MONOHYDROGEN PHOSPHATE AND CUPROUS OXIDE WITH ZINC

In this example considerably more cuprous oxide was used than in Example IV and the water content was increased by dilution of the clear alkali metal phosphate solution with the demonstration that the lead oxides are not needed. A representative formula is as follows using the steps of addition of the preceding example:

Calcium oxide coated zinc dust (6 microns) ____ 100.0
Water _____ 80.5
Potassium monohydrogen phosphate _____ 17.5
Cuprous oxide _____ 15.3

The content of cuprous oxide was increased to a value of 28 parts to give longer pot life without delaying the film curing time noticeably. These films appear to cure faster during intermittent immersion in water than in air only at ambient temperatures of 75–80° F.

*Example VI*

SYSTEMS EMPLOYING SODIUM OR POTASSIUM MONOHYDROGEN PHOSPHATE AND COLLOIDAL FERRIC HYDROXIDE WITH ZINC

Colloidal ferric hydroxide is demonstrated herein to be effective as an inhibitor and hydrogen suppressor when uniformly dispersed in sufficient concentration, this being achieved by suspending the hydroxide in water before the addition of the phosphate. The suspension with the highest concentration which is stable contains 20% ferric hydroxide and the suspending agents used maintain the hydroxide in suspension at a pH of at least 10.

The formulation consists of:

Calcium oxide coated zinc dust (6 microns) _____ 100.0
Potassium monohydrogen phosphate _____ 11.3
20% ferric hydroxide colloidal suspension _____ 66.7

The ratio of hydroxide to phosphate in the above formulation may be increased to 100 parts/11.3 parts without detracting from the pot life and coating properties. If we attempt to increase the relative amount of phosphate, however, blistering of the film on steel is likely to occur.

Having thus disclosed the invention what is claimed is as follows:

1. A coating composition for ferrous metal surfaces consisting essentially of (a) a primary coating mixture of a finely divided zinc metal dispersed in an aqueous solution of an alkali metal phosphate having a pH of between 6.5 and 11.5, the alkali metal phosphate being predominantly in the form of alkali metal monohydrogen phosphate, there being present at least 7 parts of said alkali metal monohydrogen phosphate expressed as potassium monohydrogen phosphate and not more than 25.0 parts per 100 parts of said finely divided zinc metal and (b) a metal oxide regulator for lengthening the pot life of said primary coating mixture while obviating the tendency of said primary coating mixture to blister, thereby improving the covering characteristics and film hardness and toughness when said primary coating mixture is cured at room temperature, said metal oxide regulator selected from the group consisting of litharge, mixtures of litharge and red lead containing up to 50% of red lead, mixtures of litharge and lead dioxide containing up to 50% of lead dioxide, mixtures of litharge and up to 50% of lead dioxide and red lead, cuprous oxide, colloidal ferric oxide, colloidal ferric hydroxide, and mixtures of litharge with up to 50% of cuprous oxide, colloidal ferric oxide and colloidal ferric hydroxide, these each alone and together, said metal oxide regulator being present in an amount of about 14–55% by weight of the zinc dust which is present and an amount of water in said coating composition of between 12% and 40%.

2. An inorganic non-flammable coating composition of improved pot life as claimed in claim 1 wherein said metal oxide regulator is litharge and up to 50% of red lead in an amount of from 45 to 55 parts of litharge per 100 parts of zinc and wherein said zinc has a particle size of from 4 to 10 microns.

3. An inorganic non-flammable coating composition of improved pot life as claimed in claim 1 wherein said metal oxide is a mixture of litharge and up to 50% of red lead in an amount of from 45 to 55 parts of said mixture per 100 parts of zinc and wherein said zinc has a particle size of from 4 to 10 microns.

4. An inorganic non-flammable coating composition of improved pot life as claimed in claim 1 wherein said metal oxide regulator is a mixture of litharge and up to 50% of lead dioxide in an amount of from 45 to 55 parts of said mixture per 100 parts of zinc and wherein said zinc has a particle size of from 4 to 10 microns.

5. An inorganic non-flammable coating composition of improved pot life as claimed in claim 1 wherein said metal oxide regulator is litharge and up to 50% of cuprous oxide in an amount of from 45 to 55 parts of said litharge per 100 parts of zinc and wherein said zinc has a particle size of from 4 to 10 microns.

6. An inorganic non-flammable coating composition of improved pot life as claimed in claim 1 wherein said metal oxide regulator is litharge and up to 50% of colloidal ferric hydroxide in an amount of from 45 to 55 parts of said litharge per 100 parts of zinc and wherein said zinc has a particle size of from 4 to 10 microns.

7. An inorganic non-flammable coating composition of improved pot life as claimed in claim 1 wherein said metal oxide regulator is litharge and cuprous oxide in an amount of from 14 to 25% based upon the weight of said finely divided zinc which is present.

8. An inorganic non-flammable coating composition of improved pot life as claimed in claim 1 wherein said metal oxide regulator is litharge and colloidal ferric hydroxide in an amount of from 14 to 25% based upon the weight of said finely divided zinc which is present.

9. An inorganic non-flammable coating composition of improved pot life as claimed in claim 1 wherein said metal oxide regulator is cuprous oxide in an amount of from 14 to 25% based upon the weight of said finely divided zinc which is present.

10. An inorganic non-flammable coating composition of improved pot life as claimed in claim 1 wherein said metal oxide regulator is colloidal ferric hydroxide in an amount of from 14 to 25% based upon the weight of said finely divided zinc which is present.

11. A ferrous metal article coated with a composition consisting essentially of (a) a primary coating mixture of a finely divided zinc metal dispersed in an aqueous solution of an alkali metal phosphate having a pH of between 6.5 and 11.5, the alkali metal phosphate being predominantly in the form of alkali metal monohydrogen phosphate, there being present at least 7 parts of said alkali metal monohydrogen phosphate expressed as potassium monohydrogen phosphate and not more then 25.0 parts per 100 parts of said finely divided zinc metal and (b) a metal oxide selected from the group consisting of litharge, mixtures of litharge and red lead containing up to 50% of red lead, mixtures of litharge and lead dioxide containing up to 50% of lead dioxide, mixtures of litharge and up to 50% of lead dioxide and red lead, cuprous oxide, colloidal ferric oxide, colloidal ferric hydroxide, and mixtures of litharge with up to 50% of cuprous oxide, colloidal ferric oxide and colloidal ferric hydroxide, these alone and together, said metal oxide regulator being present in an amount of about 14–55% by weight of the zinc dust which is present said regulator lengthening the pot life of the primary coating mixture while obviating the tendency of the coating mixture to blister.

12. A ferrous metal article as claimed in claim 11 wherein said metal oxide regulator is litharge and up to 50% of red lead in an amount of from 45 to 55 parts of litharge per 100 parts of zinc and wherein said zinc has a particle size of from 4 to 10 microns.

13. A ferrous metal article as claimed in claim 11 wherein said metal oxide is a mixture of litharge and up to 50% of red lead in an amount of from 45 to 55 parts of said mixture per 100 parts of zinc and wherein said zinc has a particle size of from 4 to 10 microns.

14. A ferrous metal article as claimed in claim 11 wherein said metal oxide regulator is a mixture of litharge and up to 50% of lead dioxide in an amount of from 45 to 55 parts of said mixture per 100 parts of zinc and wherein said zinc has a particle size of from 4 to 10 microns.

15. A ferrous metal article as claimed in claim 11 wherein said metal oxide regulator is litharge and up to 50% of cuprous oxide in an amount of from 45 to 55 parts of said litharge per 100 parts of zinc and wherein said zinc has a particle size of from 4 to 10 microns.

16. A ferrous metal article as claimed in claim 11 wherein said metal oxide regulator is litharge and up to 50% of colloidal ferric hydroxide in an amount of from 45 to 55 parts of said litharge per 100 parts of zinc and wherein said zinc has a particle size of from 4 to 10 microns.

17. A ferrous metal article as claimed in claim 11 wherein said metal oxide regulator is litharge and cuprous oxide in an amount of from 14 to 25% based upon the weight of said finely divided zinc which is present.

18. A ferrous metal article as claimed in claim 11 wherein said metal oxide regulator is litharge and colloidal ferric hydroxide in an amount of from 14 to 25% based upon the weight of said finely divided zinc which is present.

19. A ferrous metal article as claimed in claim 11 wherein said metal oxide regulator is cuprous oxide in an amount of from 14 to 25% based upon the weight of said finely divided zinc which is present.

20. A ferrous metal article as claimed in claim 11 wherein said metal oxide regulator is colloidal ferric hydroxide in an amount of from 14 to 25% based upon the weight of said finely divided zinc which is present.

21. A method of preparing a coating composition for use with ferrous metal surfaces comprising mixing (a) a primary coating mixture of a finely divided zinc metal to an aqueous solution of an alkali metal phosphate having a pH of between 6.5 and 11.5, the alkali metal phosphate being predominantly in the form of alkali metal monohydrogen phosphate, there being present at least 7 parts of said alkali metal monohydrogen phosphate expressed as potassium monohydrogen phosphate and not more than 25.0 parts per 100 parts of said finely divided zinc metal containing (b) a metal oxide selected from the group consisting of litharge, mixtures of litharge and red lead containing up to 50% of red lead, mixtures of litharge and lead dioxide containing up to 50% of lead dioxide, mixtures of litharge and up to 50% of lead dioxide and red lead, cuprous oxide, colloidal ferric oxide, colloidal ferric hydroxide, and mixtures of litharge with up to 50% of cuprous oxide, colloidal ferric oxide and colloidal ferric hydroxide, these each alone and together, said metal oxide regulator being present in an amount of about 14–55% by weight of the zinc dust which is present and adjusting the amount of water in said coating composition to between 12% and 40% said regulator lengthening the pot life of the primary coating mixture while obviating the tendency of the coating mixture to blister.

References Cited in the file of this patent
UNITED STATES PATENTS

| | | |
|---|---|---|
| 2,874,057 | Mayne | Feb. 17, 1959 |
| 2,944,919 | Morris et al. | July 12, 1960 |